(12) United States Patent
Coleman et al.

(10) Patent No.: US 10,605,913 B2
(45) Date of Patent: Mar. 31, 2020

(54) SONAR NOISE INTERFERENCE REJECTION

(71) Applicant: Garmin Switzerland GmbH, Schaffhausen (CH)

(72) Inventors: Aaron R. Coleman, Broken Arrow, OK (US); Jeffrey W. Hanoch, Broken Arrow, OK (US); Brian T. Maguire, Bixby, OK (US)

(73) Assignee: Garmin Switzerland GmbH (CH)

( * ) Notice: Subject to any disclaimer, the term of this patent is extended or adjusted under 35 U.S.C. 154(b) by 637 days.

(21) Appl. No.: 14/926,231

(22) Filed: Oct. 29, 2015

(65) Prior Publication Data

US 2017/0123062 A1    May 4, 2017

(51) Int. Cl.
*G01S 15/00* (2020.01)
*G01S 15/89* (2006.01)
*G01S 15/10* (2006.01)

(52) U.S. Cl.
CPC ............ *G01S 15/89* (2013.01); *G01S 15/102* (2013.01)

(58) Field of Classification Search
None
See application file for complete search history.

(56) References Cited

U.S. PATENT DOCUMENTS 2,861,320 A    11/1958  Gravley ........................ 25/25.35
3,458,854 A *  7/1969   Murphree ............... G01S 15/02
                                              367/101
3,701,089 A * 10/1972  Cowan .................. G01S 7/2806
                                              367/113
3,800,274 A *  3/1974   Peynaud ................. G01S 15/60
                                              342/104
3,803,606 A *  4/1974   Lebail .................. G01S 15/8977
                                              342/179

(Continued)

FOREIGN PATENT DOCUMENTS

WO    WO2009010583    1/2009

OTHER PUBLICATIONS

International Search Report and Written Opinion for corresponding PCT/US2015/030868 dated Jul. 31, 2015.

(Continued)

*Primary Examiner* — Isam A Alsomiri
*Assistant Examiner* — Jonathan D Armstrong
(74) *Attorney, Agent, or Firm* — Samuel M. Korte; Max M. Ali (57) ABSTRACT

A marine sonar device comprises a display, a sonar element, and a processing element. The display displays sonar images. The sonar element generates a sonar beam during a ping and presents transducer signals. The processing element is configured to instruct the sonar element to generate the sonar beam at a first frequency during a first ping, receive a first transducer signal resulting from received reflections of the sonar beam at the first frequency, filter the first transducer signal to exclude frequencies other than the first frequency, instruct the sonar element to generate the sonar beam at a second frequency during a second ping, the second frequency being different from the first frequency, receive a second transducer signal resulting from received reflections of the sonar beam at the second frequency, and filter the second transducer signal to exclude frequencies other than the second frequency.

9 Claims, 3 Drawing Sheets

(56) References Cited

U.S. PATENT DOCUMENTS

| | | | | |
|---|---|---|---|---|
| 3,842,419 | A | * | 10/1974 | Arndt .................... G01S 11/04 342/458 |
| 3,858,085 | A | * | 12/1974 | Dildy, Jr. ................ G01S 7/14 315/367 |
| 3,898,608 | A | * | 8/1975 | Jones ..................... G01H 3/125 367/7 |
| 3,924,259 | A | * | 12/1975 | Butler .................. B06B 1/0622 310/326 |
| 3,952,387 | A | | 4/1976 | Itamura ........................ 29/25.25 |
| 3,967,233 | A | * | 6/1976 | Maguer ............... G01S 7/52003 367/11 |
| 4,001,763 | A | * | 1/1977 | Kits van Heyningen .................. G10K 11/345 342/377 |
| 4,034,331 | A | * | 7/1977 | Menin .................... G01S 15/96 367/108 |
| 4,065,748 | A | * | 12/1977 | Maguer .................. G10K 11/30 367/153 |
| 4,205,395 | A | * | 5/1980 | Shortridge ................ G01S 7/60 346/33 EC |
| 4,217,684 | A | | 8/1980 | Brisken et al. ............... 29/25.35 |
| 4,234,939 | A | * | 11/1980 | Grall ................... G01S 7/52003 367/105 |
| 4,237,737 | A | * | 12/1980 | Nitadori ............. G01N 29/0609 367/7 |
| 4,288,764 | A | * | 9/1981 | Ong ........................ G01S 7/534 333/165 |
| 4,370,785 | A | | 2/1983 | Assenza et al. ............. 29/25.35 |
| 4,385,255 | A | | 5/1983 | Yamaguchi et al. .......... 310/335 |
| 4,404,489 | A | | 9/1983 | Larson, III et al. .......... 310/334 |
| 4,406,967 | A | | 9/1983 | Obara et al. .................. 310/366 |
| 4,410,966 | A | * | 10/1983 | Meyer ..................... G01S 15/88 367/106 |
| 4,411,052 | A | | 10/1983 | Kampf ......................... 29/25.35 |
| 4,471,473 | A | * | 9/1984 | Ziese ..................... G01S 15/42 367/103 |
| 4,472,793 | A | * | 9/1984 | Benjaminson .......... G01S 15/34 340/870.13 |
| 4,683,396 | A | | 7/1987 | Takeuchi et al. ............. 310/358 |
| 4,701,659 | A | | 10/1987 | Fujii et al. .................... 310/334 |
| 4,712,201 | A | * | 12/1987 | Lagier ..................... F41G 7/228 367/92 |
| 4,734,963 | A | | 4/1988 | Ishiyama ..................... 29/25.35 |
| 4,747,192 | A | | 5/1988 | Rokurota ..................... 29/25.35 |
| 4,773,140 | A | | 9/1988 | McAusland ................. 29/25.35 |
| 4,803,392 | A | | 2/1989 | Kushida et al. .............. 310/311 |
| 4,848,354 | A | * | 7/1989 | Angelsen ................. A61B 8/06 600/441 |
| 4,855,961 | A | * | 8/1989 | Jaffe ........................ G01S 15/89 367/101 |
| 5,051,799 | A | | 9/1991 | Paul et al. ...................... 375/25 |
| 5,275,167 | A | | 1/1994 | Killam ...................... 128/662.03 |
| 5,537,380 | A | | 7/1996 | Sprankle, Jr. et al. ....... 369/291 |
| 5,655,276 | A | | 8/1997 | Pattanayak et al. ......... 29/25.35 |
| 5,730,113 | A | | 3/1998 | Wildes et al. ............. 125/13.01 |
| 5,792,058 | A | | 8/1998 | Lee et al. ....................... 600/459 |
| 5,920,523 | A | | 7/1999 | Hanafy et al. ................. 367/140 |
| 5,920,972 | A | | 7/1999 | Palczewska et al. ........ 29/25.35 |
| 5,931,684 | A | | 8/1999 | Obendorf et al. .............. 439/67 |
| 6,043,590 | A | | 3/2000 | Gilmore ........................ 310/367 |
| 6,100,626 | A | | 8/2000 | Frey et al. ..................... 310/334 |
| 6,110,314 | A | | 8/2000 | Nix et al. ...................... 156/218 |
| 6,198,692 | B1 | | 3/2001 | Sekine ............................ 367/11 |
| 6,263,551 | B1 | | 7/2001 | Lorraine et al. ............. 29/25.35 |
| 6,445,646 | B1 | | 9/2002 | Handa et al. .................. 367/105 |
| 6,541,896 | B1 | | 4/2003 | Piel, Jr. et al. ............... 310/334 |
| 6,678,210 | B2 | | 1/2004 | Rowe ............................ 367/103 |
| 6,775,388 | B1 | | 8/2004 | Pompei ......................... 381/191 |
| 6,894,425 | B1 | | 5/2005 | Solomon et al. ............. 310/334 |
| 7,035,166 | B2 | | 4/2006 | Zimmerman et al. .......... 367/88 |
| 7,123,546 | B2 | | 10/2006 | Zimmerman et al. ........ 367/103 |
| 7,173,879 | B2 | | 2/2007 | Zimmerman et al. ........ 367/103 |
| 7,355,924 | B2 | | 4/2008 | Zimmerman et al. .......... 367/88 |
| 7,508,737 | B1 | | 3/2009 | Alexandru .................... 367/103 |
| 7,846,101 | B2 | | 12/2010 | Eberle et al. ................. 600/459 |
| 8,008,842 | B2 | | 8/2011 | Jiang et al. .................... 310/334 |
| RE45,379 | E | | 2/2015 | Rowe ........................... 367/103 |
| 2003/0214880 | A1 | * | 11/2003 | Rowe .................... G10K 11/343 367/103 |
| 2005/0036404 | A1 | | 2/2005 | Zhu et al. ....................... 367/88 |
| 2007/0070814 | A1 | | 3/2007 | Frodyma et al. ............. 367/134 |
| 2007/0093715 | A1 | | 4/2007 | Hippe et al. .................. 600/437 |
| 2008/0192575 | A1 | | 8/2008 | Coleman ....................... 367/115 |
| 2010/0103775 | A1 | | 4/2010 | Betts et al. .................... 345/168 |
| 2011/0202278 | A1 | | 8/2011 | Caute et al. ..................... 702/14 |
| 2011/0299630 | A1 | | 12/2011 | Petrovic ....................... 375/340 |
| 2013/0107487 | A1 | | 5/2013 | Wodnicki et al. ............ 361/784 |
| 2015/0354980 | A1 | * | 12/2015 | Wahdan ................ G01C 17/38 324/202 |

OTHER PUBLICATIONS

International Search Report and Written Opinion for corresponding PCT/US2015/030871 dated Aug. 27, 2015.
International Search Report and Written Opinion for corresponding PCT/US2015/030866 dated Jan. 6, 2016.
SeaBeam Multibeam Operation, published 2000.
Wassp WMB160F Multi-Beam Fishing System Display Modes (published 2007).
How Wassp Works, published 2012.
Wassp Navigator brochure, published 2012.
Wassp 2013 Brochure, published 2013.
U.S. Appl. No. 14/604,321, filed Jan. 23, 2015.
U.S. Appl. No. 14/604,335, filed Jan. 23, 2015.
U.S. Appl. No. 14/604,242, filed Jan. 23, 2015.
U.S. Appl. No. 14/604,347, filed Jan. 23, 2015.
U.S. Appl. No. 14/604,266, filed Jan. 23, 2015.

* cited by examiner

SONAR NOISE INTERFERENCE REJECTION

BACKGROUND

Marine sonar devices display sonar images derived from reflections of a sonar beam transmitted into a body of water. The display device may include, or be in communication with, a sonar element, such as one or more transducers, which generates the sonar beam. In a typical scenario, the sonar element may be mounted on, or otherwise positioned at, the bow of a marine vessel. The sonar element may generate the sonar beam, known as a "ping", into the water in front of the marine vessel. Thus, the display may show sonar images of the objects in the water in front of the marine vessel. However, noise resulting from various phenomena can cause undesirable artifacts on the displayed image such as displaying objects that do not exist in the water or displaying rings or ghosts around the objects that do exist. Noise can be caused by interference sources in or out of the water, motion of objects in the water, a high ping rate causing echoes of the previous ping during the current ping, and the like. Some of the noise can be reduced by lowering the ping rate, but a drawback to this approach is the reduction of the frame refresh rate of the display, which may lead to jerky images on the display. Furthermore, lowering of the ping rate does not reduce noise from other sources.

SUMMARY

Embodiments of the present technology provide a marine sonar device that rejects or reduces the types of noise mentioned above. The device may generate a sonar beam at different frequencies on successive pings. The device may also generate the sonar beam into a plurality of sectors of the water, wherein each sector receives the sonar beam at a different frequency.

An embodiment of the marine sonar device broadly comprises a display, a sonar element, a memory element, and a processing element. The display may be configured to display sonar images. The sonar element may generate a sonar beam during a ping and present transducer signals. The processing element may be in communication with the display, the sonar element, and the memory element. The processing element may be configured to instruct the sonar element to generate the sonar beam at a first frequency during a first ping, receive a first transducer signal resulting from received reflections of the sonar beam at the first frequency, filter the first transducer signal to exclude frequencies other than the first frequency, instruct the sonar element to generate the sonar beam at a second frequency during a second ping, the second frequency being different from the first frequency, receive a second transducer signal resulting from received reflections of the sonar beam at the second frequency, and filter the second transducer signal to exclude frequencies other than the second frequency.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 5:
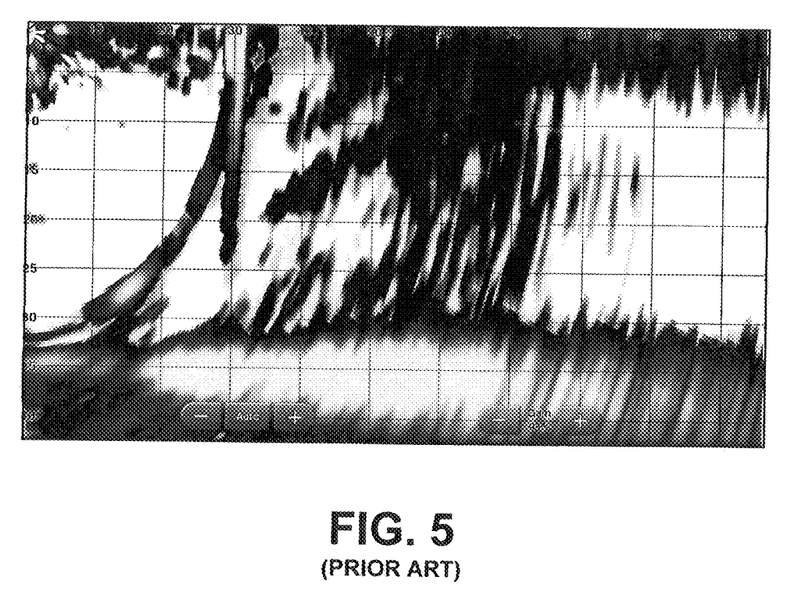
FIG. 5 is a screen capture of a sonar image from a prior art embodiment of a marine sonar device, the sonar image showing a great deal of on-screen noise and clutter.

Embodiments of the present technology relate to a marine sonar device that utilizes frequency hopping technology. Marine sonar devices typically include or communicate with sonar elements that generate a sonar beam into a body of water during what is known as a "ping". "Ping," as used herein, refers to the transmission of one or more sonar beams at one or more frequencies. Thus, a ping is not limited to a single transmission at a single frequency. For example, in configurations, the ping described herein may comprise a sequential transmission (burst) where each transmission has a different frequency. Reflections from objects in the water return to the sonar element, which in turn generates an electronic signal that is used to form a sonar image shown on the display. Prior art marine sonar devices that do not employ frequency hopping may display sonar images such as the one shown in FIG. 5, which includes on-screen noise and clutter resulting from the factors discussed in the Background. The on-screen noise and clutter appears as dark-colored bands and splotches on the sonar image.

The marine sonar device of the present technology includes a sonar element that may generate the sonar beam at a first frequency during successive odd-numbered pings and a second frequency during successive even-numbered pings. The marine sonar device may form and display a single sonar image from the sonar beam reflections of the two frequencies after each ping. Other embodiments of the marine sonar device include a sonar element that may generate the sonar beam into each of a plurality of sectors of the water in turn. The sonar beam may be generated into each sector at a different frequency. On successive pings, the frequency of the sonar beam generated into each sector may be rotated through a plurality of predetermined frequencies or may be chosen at random from the predetermined frequencies.

Embodiments of the technology will now be described in more detail with reference to the drawing figures. Referring to FIGS. 1-4, a marine sonar device 10 is illustrated which is configured to reject or reduce noise which causes unwanted artifacts on sonar images. The marine sonar device 10 broadly comprises a housing 12, a display 14, a sonar element 16, a memory element 18, and a processing element 20.

Figure 1:
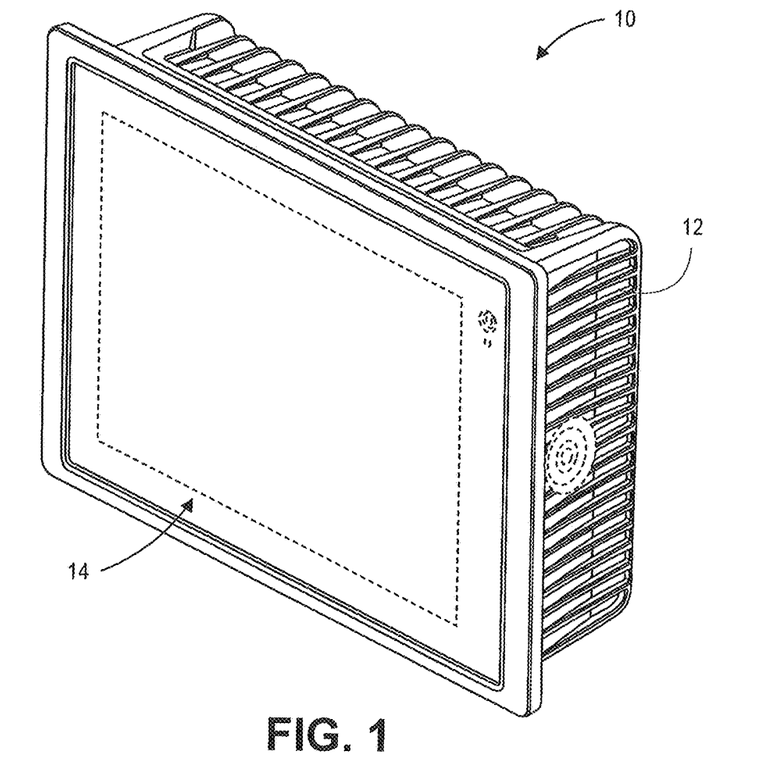
FIG. 1 is a front perspective view of a marine sonar device constructed in accordance with various embodiments of the present technology.
Figure 2:
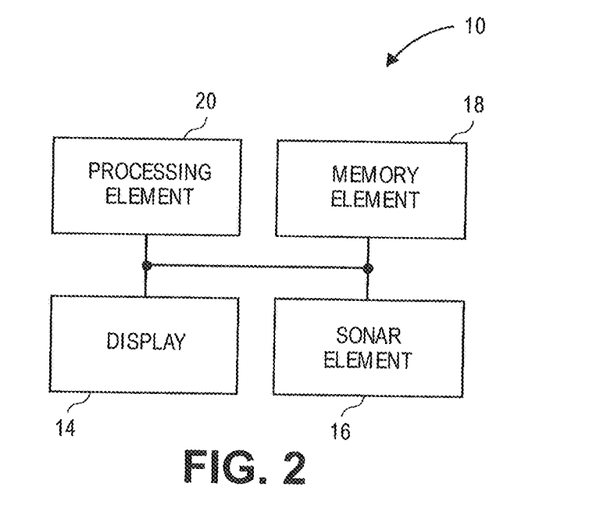
FIG. 2 is a schematic block diagram of various electronic components of the marine sonar device.

The housing 12, as shown in FIG. 1, generally encloses and protects the other components, except the sonar element 16, from moisture, vibration, and impact. The housing 12 may include mounting hardware for removably securing the marine sonar device 10 to a surface within the marine vessel or may be configured to be panel-mounted within the marine vessel. The housing 12 may be constructed from a suitable lightweight and impact-resistant material such as, for example, plastic, nylon, aluminum, or any combination thereof. The housing 12 may include one or more appropriate gaskets or seals to make it substantially waterproof or resistant. The housing 12 may take any suitable shape or size, and the particular size, weight and configuration of the housing 12 may be changed without departing from the scope of the present technology.

The display 14, as shown in FIG. 1, may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 14 may possess a square or a rectangular aspect ratio and may be viewed in either a landscape or a portrait mode. In various embodiments, the display 14 may also include a touch screen occupying the entire screen or a portion thereof so that the display 14 functions as part of a user interface. The touch screen may allow the user to interact with the marine sonar device 10 by physically touching, swiping, or gesturing on areas of the screen.

The sonar element 16 may generate a sonar beam 22 into a body of water. As used herein, "sonar beam" may refer to typically oscillatory acoustic radiation that is generated or transmitted into the water. The radiation is generally ultrasonic and may have a frequency range from approximately 50 kiloHertz (kHz) to approximately 1 megahertz (MHz).

The sonar element 16 may also receive reflections of the sonar beam 22 from objects in the water as well as the bed or bottom of the body of water.

Figure 3:
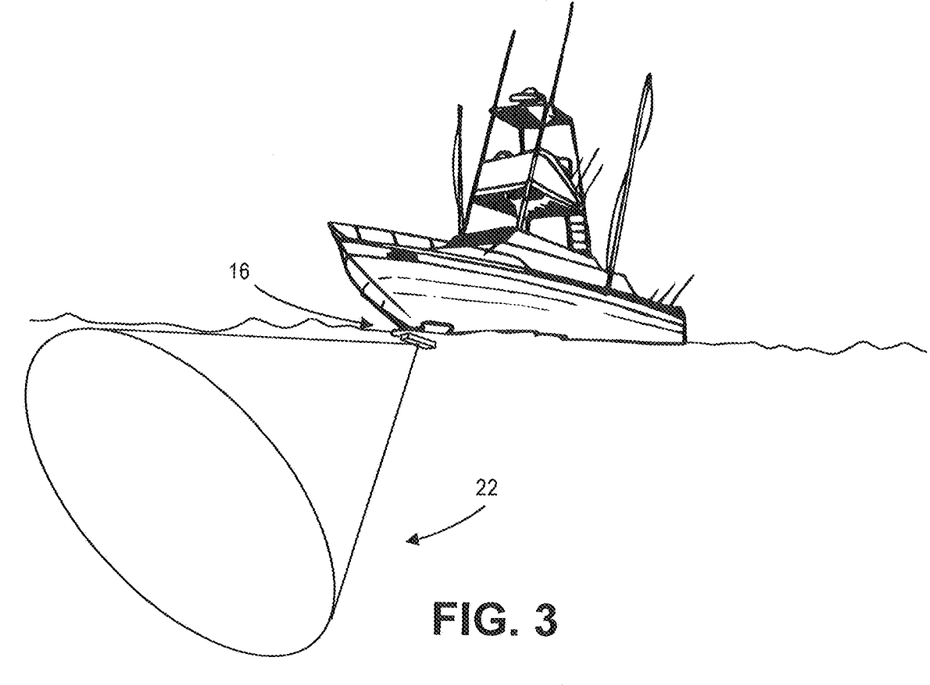
FIG. 3 is a front perspective view of a marine vessel equipped with a first embodiment of a sonar element of the marine sonar device.

In some embodiments, the sonar element 16 may be rectangular bar shaped or cylindrical puck shaped and may be formed from ceramic materials that exhibit piezoelectric transducing properties, such as barium titanate, lead titanate, lead zirconate titanate (PZT), lithium niobate, lithium tantalate, bismuth ferrite, sodium niobate, and the like, or combinations thereof. In such embodiments, the sonar beam 22 may have a wide angle projection and may have a fan or pyramidal shape, or a roughly conical shape, as shown in FIG. 3, depending on the shape of the sonar element 16. The sonar beam 22 may further include side lobes, which are not shown in the figures.

Alternatively, the sonar element 16 may include one or more transmit elements that transmit the sonar beam 22 and one or more receive elements that receive the reflections. The transmit elements may include ceramic components such as those described above. The receive elements may include one or more sheets of polymer material such as polyvinylidene difluoride (PVDF). Examples of such embodiments may be described in U.S. Patent Application Publication No. 20140092709, titled "PVDF SONAR TRANSDUCER SYSTEM", filed May 23, 2013, incorporated by reference herein in its entirety.

Figure 4:
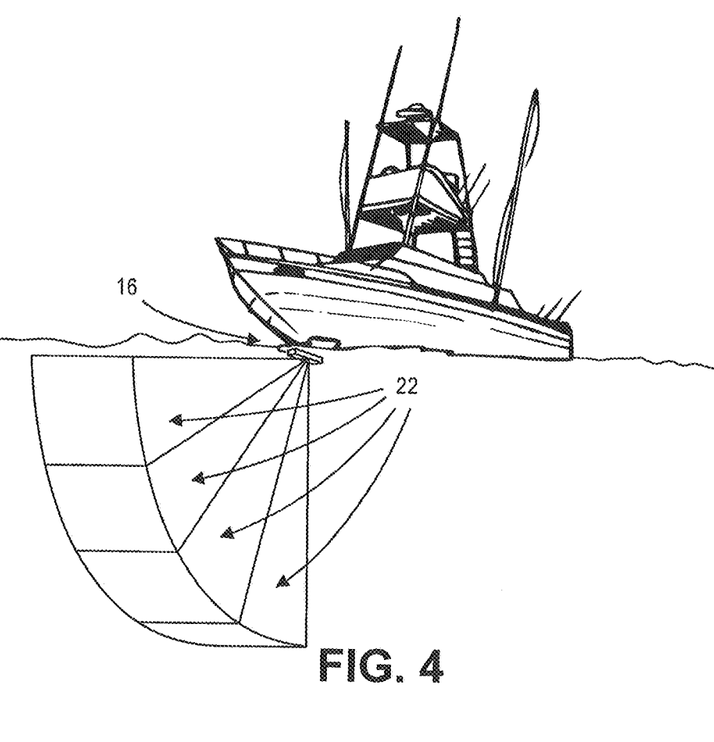
FIG. 4 is a front perspective view of a marine vessel equipped with a second embodiment of a sonar element of the marine sonar device.

In other embodiments, the sonar element 16 may include a plurality of transducers or transducer elements that form a phased-array multibeam sonar transmitter and receiver. Each transducer may be formed from piezoelectric materials like ceramics such as PZT or polymers such as PVDF. The transducers may include a first array of transmit transducers that generate the sonar beam 22 and a second array of receive transducers that receive reflections of the sonar beam 22. The transducers of each array are spaced apart from one another and positioned along a linear axis. In some configurations, the two arrays are oriented such that the transmit transducers are orthogonal to the receive transducers, and the combination of the two forms either a plus sign (+) or a tee (T). In other configurations, the array of transmit transducers is oriented along the same axis as the array of receive transducers—either axially aligned and abutting one another or parallel and adjacent to one another. The sonar beam 22 generated from the phased-array multibeam sonar element 16 may have a narrow angle projection that can be generated in a one of a plurality of sectors in the water, as shown in FIG. 4. In various embodiments, the sonar beam 22 may further include side lobes, such that the sonar beam 22 generated into one sector may overlap the sonar beam 22 generated into an adjacent sector. Examples of the phased-array multibeam sonar element 16 may be described in U.S. patent application Ser. No. 14/604,321, titled "MARINE MULTIBEAM SONAR DEVICE", filed Jan. 23, 2015, incorporated by reference herein in its entirety.

The sonar element 16 may receive an electronic transmit transducer signal from the processing element 20, the signal being used to generate the sonar beam 22. The transmit transducer signal may include a pulse or a series of pulses with an amplitude and a frequency. Likewise, the sonar beam 22 may include a series of acoustic energy pulses with an amplitude and a frequency corresponding to that of the transmit transducer signal. Typically, the generation of the sonar beam 22 is known as a "ping". The sonar element 16 may also generate an electronic receive transducer signal with characteristics, such as amplitude, waveform shape, time delay, and the like, of the reflected sonar beam 22. The receive transducer signal may be communicated to the processing element 20.

In embodiments wherein the sonar element 16 includes phased-array multibeam sonar transducers, the sonar element 16 may receive a plurality of transmit transducer signals, each signal being phase-adjusted so that the array of transmit transducers may generate the sonar beam 22 into a particular sector of the water or angular direction from the sonar element 16. Likewise, the sonar element 16 may generate a plurality of receive transducer signals, the signals being processed by the processing element 20 to determine a particular sector or angular direction from which the sonar beam 22 is received.

The sonar element 16 may be mounted on a hull of a marine vessel anywhere which provides access to the body of water. For example, the sonar element 16 may be mounted below the waterline toward the bow facing forward (such as shown in FIGS. 3 and 4), on the bottom of the hull facing downward, or on the port and/or starboard sides of the hull facing to the sides. In additional or alternative embodiments, the sonar element 16 may be configured for towing behind the marine vessel, for use with a remote operated vehicle (ROV) or autonomous vehicle associated with the marine vessel, and/or for extension from the hull of the marine vessel via mounting brackets, transom and trolling mounts, and the like.

The memory element 18 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 18 may be embedded in, or packaged in the same package as, the processing element 20. The memory element 18 may include, or may constitute, a "computer-readable medium". The memory element 18 may store the instructions, code, code segments, software, firmware, programs, applications, apps, services, daemons, or the like that are executed by the processing element 20. The memory element 18 may also store settings, data, documents, sound files, photographs, movies, images, databases, and the like.

The processing element 20 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 20 may generally execute, process, or run instructions, code, code segments, software, firmware, programs, applications, apps, processes, services, daemons, or the like. The processing element 20 may also include hardware components such as finite-state machines, sequential and combinational logic, and other electronic circuits that can perform the functions necessary for the operation of the present technology. The processing element 20 may be in communication with the other electronic components through serial or parallel links that include address busses, data busses, control lines, and the like.

The processing element 20 may be programmed or configured, through software, firmware, hardware, or combinations thereof, to perform the following functions. In order to update the display 14 with the latest sonar images, the processing element 20 may repeatedly instruct the sonar element 16 to generate the sonar beam 22. The processing element 20 may instruct the sonar element 16 to generate the sonar beam 22 at a different frequency on successive pings. For example, the processing element 20 may instruct the sonar element 16 to generate the sonar beam 22 at a first frequency on a first ping and at a second frequency on a second ping. Extending the pattern, the processing element 20 may instruct the sonar element 16 to generate the sonar beam 22 at the first frequency on odd-numbered pings and at the second frequency on even-numbered pings. More generally, the processing element 20 may utilize any number of frequencies, although probably not more than ten.

In more detail, the processing element 20 may communicate a first transmit transducer signal to the sonar element 16. The first transmit transducer signal may include a first frequency and the appropriate amplitude and phase characteristics for the sonar element 16 to generate the sonar beam 22. Upon receipt of the signal, or upon receipt of the signal and a control signal to initiate generation of the sonar beam 22, the sonar element 16 may generate the sonar beam 22 at a first frequency during a first ping. After a period of time during which the sonar beam 22 may travel from the sonar element 16, reflect off of a plurality of underwater objects, and return again to the sonar element 16, the sonar element 16 may generate a first receive transducer signal. The processing element 20 may receive the first receive transducer signal and may bandpass filter the signal at the first frequency such that other frequency components are filtered out. The processing element 20 may calculate first frequency sonar data from the first receive transducer signal.

Either after the processing element 20 receives the first receive transducer signal from the sonar element 16, or before it does, the processing element 20 may communicate a second transmit transducer signal to the sonar element 16. The second transmit transducer signal may include a second frequency. The sonar element 16 may generate the sonar beam 22 at a second frequency during a second ping. When the sonar element 16 receives the reflections from the sonar beam 22, it may generate a second receive transducer signal. The processing element 20 may receive the second receive transducer signal and may bandpass filter the signal at the second frequency. The processing element 20 may calculate second frequency sonar data from the second receive transducer signal. The processing element 20 may then generate a single sonar image from the first frequency sonar data and the second frequency sonar data. In various embodiments, the processing element 20 may correlate the first frequency sonar data and the second frequency sonar data, and then may generate a single sonar image from the correlated data. The sonar image is shown on the display 14.

On subsequent odd-numbered pings, the processing element 20 may communicate the first transmit transducer signal to the sonar element 16, which in turn, may generate the sonar beam 22 at the first frequency. The sonar element 16 may receive the reflections and generate the first receive transducer signal. The processing element 20 may bandpass filter the signal at the first frequency and may calculate the first frequency sonar data from the first receive transducer signal. The processing element 20 may then generate a single sonar image from the calculated sonar data of the two most-recently generated (odd and even) pings. In various embodiments, the processing element 20 may correlate the calculated sonar data of the two most-recently generated pings, and then may generate a single sonar image from the correlated data. The sonar image is shown on the display 14.

On subsequent even-numbered pings, the processing element 20 may communicate the second transmit transducer signal to the sonar element 16, which in turn, may generate the sonar beam 22 at the second frequency. The sonar element 16 may receive the reflections and generate the second receive transducer signal. The processing element 20 may bandpass filter the signal at the second frequency and may calculate the second frequency sonar data from the second receive transducer signal. Likewise, with the odd-numbered pings, the processing element 20 may then generate a single sonar image from the calculated sonar data of the two most-recently generated pings. In various embodiments, the processing element 20 may correlate the calculated sonar data of the two most-recently generated (even and odd) pings, and then may generate a sonar image from the correlated data. The sonar image is shown on the display 14.

The values of the first and second frequencies may vary according to physical characteristics of the sonar element 16. For example, the sonar element's 16 transducing element(s) may have a transmit and receive frequency response with a limited bandwidth. Thus, the first frequency may be chosen to be near the peak of the frequency response of the transducing element(s). In order to maintain performance of the sonar element 16, the second frequency may be chosen, or determined, to be close to the first frequency. In various embodiments, the second frequency may be chosen to be equal to the first frequency plus or minus 20%. For example, if the sonar element's 16 transducing element(s) have a peak response frequency around 400 kilohertz (kHz), then the first frequency is chosen to be approximately 400 kHz, and the second frequency may range from approximately 320 kHz to approximately 480 kHz. If additional frequencies are used, then they are also chosen from the first frequency plus or minus 10% range.

The present technology may also utilize other techniques. For embodiments in which the sonar element 16 includes phased-array multibeam sonar transducers, such as the one shown in FIG. 4, the processing element 20 may instruct the sonar element 16 to generate the sonar beam 22 into a plurality of sectors of the water, each sector receiving the sonar beam 22 at a different frequency. The sectors of the water may correspond ranges of angles at which the sonar beam 22 is projected from the sonar element 16 into the water. For example, if the sonar element 16 can project the sonar beam 22 through a total range of angles equal to 90 degrees and the water is divided into four sectors, then each sector of the water occupies a range of 22.5 degrees. Furthermore, the sonar beam 22 and the sectors into which the sonar beam 22 is generated may be oriented along a port-starboard line or a fore-aft line. In configurations where the device 10, or portions thereof, are mounted to a trolling motor, the trolling motor may be freely rotated by a user to direct the sonar beam 22 in any direction.

When implementing this technique, the processing element 20 may generate a different frequency for the sonar beam 22 for each sector of the water, wherein the frequency changes on each ping that is generated. Specifically, the processing element 20 may generate an array of frequencies with the number of frequencies equivalent to the number of sectors of the water. Thus, if there are four sectors of water, then the processing element 20 generates four frequencies. Following the parameters discussed above for choosing or determining a frequency for the sonar beam 22, the processing element 20 may be programmed to generate a first frequency near the peak of the frequency response of the transducing element(s). The processing element 20 may be further programmed to generate the remaining frequencies having values in the first frequency plus or minus 20% range. So, for example, if the first frequency is determined to be 400 kHz, then the second, third, and fourth frequencies may have values of 410 kHz, 420 kHz, and 430 kHz, respectively.

The technique may be implemented as follows. The marine sonar device 10 may generate a first ping into each sector of the water. The processing element 20 may communicate a first transmit transducer signal including the first frequency to the sonar element 16 which generates the sonar beam 22 at a first angle into the first sector. The processing element 20 may communicate a second transmit transducer signal including the second frequency to the sonar element 16 which generates the sonar beam 22 at a second angle into the second sector. The processing element 20 may communicate a third transmit transducer signal including the third frequency to the sonar element 16 which generates the sonar beam 22 at a third angle into the third sector. The processing element 20 may communicate a fourth transmit transducer signal including the fourth frequency to the sonar element 16 which generates the sonar beam 22 at a fourth angle into the fourth sector. The first, second, third, and fourth transmit transducer signals and the corresponding sonar beams 22 may be generated in sequential order, typically, as quickly as they can be generated by the processing element 20 and the sonar element 16. Alternatively, the first, second, third, and fourth transmit transducer signals and the corresponding sonar beams 22 may be generated simultaneously as one waveform.

When the sonar element 16 receives the reflections from the sonar beam 22 at the first angle, it may generate a first receive transducer signal. The processing element 20 may bandpass filter the first receive transducer signal at the first frequency. When the sonar element 16 receives the reflections from the sonar beam 22 at the second angle, it may generate a second receive transducer signal. The processing element 20 may bandpass filter the second receive transducer signal at the second frequency. When the sonar element 16 receives the reflections from the sonar beam 22 at the third angle, it may generate a third receive transducer signal. The processing element 20 may bandpass filter the third receive transducer signal at the third frequency. When the sonar element 16 receives the reflections from the sonar beam 22 at the fourth angle, it may generate a fourth receive transducer signal. The processing element 20 may bandpass filter the fourth receive transducer signal at the fourth frequency. The processing element 20 may then generate a sonar image from the data derived from the filtered signals, such that the data from each signal contributes to a portion of the image. For example, the data from the first receive transducer signal may be used to generate the portion of the sonar image that corresponds to the first angle, which in turn, corresponds to the first sector of the water. The data from the second, third, and fourth receive transducer signals may be used to generate the remaining portions of the sonar image corresponding to second, third, and fourth angles and second, third, and fourth sectors, respectively.

On subsequent pings, the processing element 20 may rotate the frequency that is included in each transmit transducer signal. For example, as shown in Table 1 below, during the second ping, the processing element 20 may generate the first transmit transducer signal to include the fourth frequency such that the sonar element 16 generates the sonar beam 22 at the fourth frequency into the first sector. The processing element 20 may follow suit with the remaining transmit signals so that the second, third, and fourth transmit transducer signals include the first, second, and third frequencies, respectively. Thus, the sonar element 16 generates the sonar beam 22 at the first, second, and third frequencies into the second, third, and fourth sectors, respectively.

TABLE 1

| SECTOR NO. | FREQUENCY NO. DURING FIRST PING PER SECTOR | FREQUENCY NO. DURING SECOND PING PER SECTOR |
|---|---|---|
| 1 | 1 | 4 |
| 2 | 2 | 1 |
| 3 | 3 | 2 |
| 4 | 4 | 3 |

When the sonar element 16 receives the reflections from the sonar beam 22 at the first angle, it may generate the first receive transducer signal. However, the processing element 20 may bandpass filter the first receive transducer signal at the fourth frequency, instead of the first frequency. The processing element 20 may follow suit with the other receive signals—bandpass filtering the second receive transducer signal at the first frequency, bandpass filtering the third receive transducer signal at the second frequency, and bandpass filtering the fourth receive transducer signal at the third frequency. The processing element 20 may generate the sonar image in the same fashion as described above, with data from the first, second, third, and fourth receive transducer signals being used to generate portions of the sonar image corresponding to first, second, third, and fourth angles and first, second, third, and fourth sectors, respectively. The processing element 20 may continue the frequency rotation process, with each sector receiving the sonar beam 22 at each frequency on successive pings and returning to the first frequency after the fourth frequency has been generated.

In other embodiments, the processing element 20 may select a frequency at random from the pre-determined frequencies at which to generate the sonar beam 22 into each sector during each ping. For example, during the first ping, the processing element 20 may randomly select that the sonar beam 22 be generated at the third frequency into the first sector of water. The processing element 20 may then select the frequency for the other sectors from the remaining frequencies available. Thus, to continue the example, the processing element 20 may select that the sonar beam 22 be generated at the first, fourth, and second frequencies into the second, third, and fourth sectors of water, respectively. The receive transducer signals may be bandpass filtered at the corresponding frequency for each sector. And the sonar image may be generated in the same fashion as discussed above. On subsequent pings, the processing element 20 may repeat the same process of random frequency selection for the sonar beam 22 to be generated into each sector of the water.

In still other embodiments, the processing element 20 may utilize just a first frequency and a second frequency at which to generate the sonar beam 22 into the sectors. For example, the processing element 1A may instruct the sonar element 16 to generate the sonar beam 22 at the first frequency into the odd-numbered sectors and at the second frequency into the even-numbered sectors. The receive transducer signals may be bandpass filtered at the corresponding frequency for each sector. And the sonar image may be generated in the same fashion as discussed above. On subsequent pings, the processing element 20 may toggle the frequency at which the sonar beam 22 is generated from first to second, or second to first, as appropriate for each sector. As well, the receive transducer signals may be bandpass filtered at the corresponding frequency for each sector, and the sonar image may be generated in the same fashion as discussed above.

The marine sonar device 10 may operate as follows. In some embodiments, wherein the sonar element 16 may generate a wide-angle sonar beam 22, as shown in FIG. 3, whose angle of projection cannot be varied, the processing element 20 may instruct the sonar element 16 to generate the sonar beam 22 at a first frequency on odd-numbered pings and a second frequency on even-numbered pings. After every ping of the sonar beam 22, the processing element 20 may bandpass filter the receive transducer signal at the appropriate frequency and may calculate sonar data from the filtered signal. In addition, (except after the first ping), the processing element 20 may generate a sonar image from the sonar data from the two most recent pings. In various embodiments, the processing element 20 may also correlate the sonar data from the two most recent pings and generate a sonar image from the correlated data. The display 14 may show the sonar images on the screen, updating the screen with the latest sonar image as soon as it is received from the processing element 20.

In other embodiments, wherein the sonar element 16 may generate a narrow-angle sonar beam 22, as shown in FIG. 4, whose angle of projection can be programmably varied, the processing element 20 may instruct the sonar element 16 to generate the sonar beam 22 into each sector of the water at a different frequency per ping for all sectors. The sonar element 16 may generate a receive transducer signal for each sector, and the processing element 20 may bandpass filter the signal at a frequency corresponding to the frequency at which the sonar beam 22 was generated. The processing element 20 may generate sonar data for the signals from each sector of the water. The processing element 20 may then generate a sonar image with the sonar data from each sector forming a corresponding portion of the sonar image. On successive pings, the processing element 20 may rotate the frequencies among the sectors, with each sector receiving the sonar beam 22 at the frequency generated to an adjacent channel on the previous ping. Alternatively, the processing element 20 may select a frequency at random from a plurality of predetermined frequencies at which the sonar beam 22 is generated into each sector of the water. In either event, the processing element 20 may bandpass filter the receive transducer signals at a frequency corresponding to the frequency at which the sonar beam 22 was generated. And, the processing element 20 may then generate the sonar image with the sonar data from each sector. The display 14 may show the sonar images on the screen, updating the screen with the latest sonar image as soon as it is received from the processing element 20.

Figure 6:
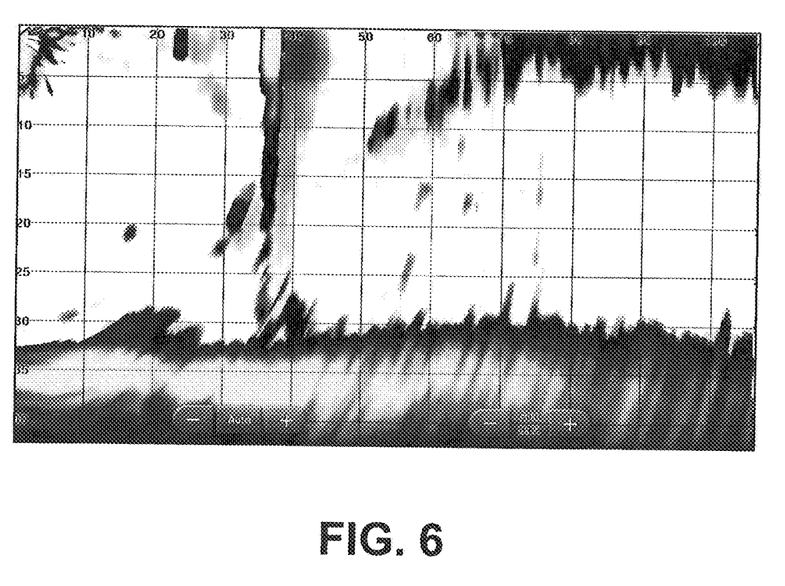
FIG. 6 is a screen capture of a sonar image from the marine sonar device of the present technology, the screen showing greatly reduced on-screen noise and clutter.

Utilizing either set of embodiments of the marine sonar device 10 described above, a dramatic rejection or reduction of on-screen noise and artifacts can be achieved. Specifically, utilizing a phased-array multibeam sonar element 16, as depicted in FIG. 4, the sonar image shown in FIG. 6 can be generated. The sonar image shows a view of the water in front of the marine vessel, with the sonar element 16 being positioned out of the frame in the upper left corner. Thus, the left of the frame is closer to the marine vessel, the right of the frame is farther from the marine vessel, the top of the frame is shallow water, and the bottom of the frame is deeper water. Compared with the sonar image of FIG. 5, which shows a view of roughly the same space of water, the sonar image of FIG. 6 shows much less noise and clutter—particularly in the shallower water at a medium distance from the marine vessel. Therefore, the sportsman operating the marine sonar device 10 can have greater confidence that the returns visible on the screen represent actual objects in the water and not false images resulting from signal interference.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A marine sonar device comprising:
a display configured to display sonar images;
a sonar element configured to
generate a sonar beam during a ping into one of a plurality of sectors of a body of water, each sector corresponding to a range of projection angles with respect to the sonar element, and
present transducer signals;
a non-transitory memory element; and
a processing element in communication with the display, the sonar element, and the memory element, the processing element configured to—
instruct the sonar element to generate the sonar beam into each sector, one frequency per sector, the sonar beam being generated at a different one of a plurality of frequencies into at least adjacent sectors, wherein the frequencies of the sonar beam include a first frequency and the values of other frequencies are within a range of a value of the first frequency plus or minus 20%,
receive one of a plurality of transducer signals per ping, each transducer signal resulting from received reflections of the sonar beam in the corresponding sector at the corresponding generated frequency for each sector,
filter each transducer signal to exclude frequencies other than the corresponding generated frequency,
calculate sonar data from each transducer signal, and
generate a single sonar image from all of the sonar data.

2. The marine sonar device of claim 1, wherein the sonar data from each sector corresponds to an area of the sonar image and the sonar data from all of the sectors forms the entire sonar image.

3. The marine sonar device of claim 1, wherein the frequencies of the sonar beam include an array of frequencies, with a number of frequencies equivalent to a number of sectors, and the processing element is further configured to generate the sonar beam into the sectors in numerical order, each sector receiving the sonar beam at a frequency with a value different from the previous sector.

4. The marine sonar device of claim 1, wherein the frequencies of the sonar beam include an array of frequencies, with a number of frequencies equivalent to a number of sectors, and the processing element is further configured to generate the sonar beam into each sector at a frequency randomly chosen from the array.

5. A marine sonar device comprising:
a display configured to display sonar images;
a sonar element configured to
generate a sonar beam during a ping into one of a plurality of sectors of a body of water, each sector corresponding to a range of projection angles with respect to the sonar element, and
present transducer signals;
a non-transitory memory element; and
a processing element in communication with the display, the sonar element, and the memory element, the processing element configured to repeatedly—
instruct the sonar element to successively generate the sonar beam into the sectors wherein the sonar beam is generated into one frequency per sector, each sector receiving the sonar beam at a different one of a plurality of frequencies and a different frequency for at least two consecutive pings, wherein the frequencies of the sonar beam include a first frequency and the values of other frequencies are within a range of a value of the first frequency plus or minus 20%,
receive one of a plurality of transducer signals per ping, each transducer signal resulting from received reflections of the sonar beam in the corresponding sector at the corresponding generated frequency for each sector,
filter each transducer signal to exclude frequencies other than the corresponding generated frequency,
calculate sonar data from one transducer signal per ping, and
generate a single sonar image from the sonar data from all of the sectors.

6. The marine sonar device of claim 5, wherein the sonar data from each sector corresponds to an area of the sonar image and the sonar data from all of the sectors forms the entire sonar image.

7. The marine sonar device of claim 5, wherein the frequencies of the sonar beam include an array of frequencies, with a number of frequencies equivalent to a number of sectors, and the processing element is further configured to generate the sonar beam into the sectors in numerical order, the sectors receiving the frequencies in the order that they occur in the array.

8. The marine sonar device of claim 7, wherein the processing element is further configured to generate the sonar beam at the first frequency in the array on the ping after it has generated the last frequency in the array.

9. The marine sonar device of claim 5, wherein the frequencies of the sonar beam include an array of frequencies, with a number of frequencies equivalent to a number of sectors, and the processing element is further configured to generate the sonar beam into each sector at a frequency randomly chosen from the array.

* * * * *